Figure 1:
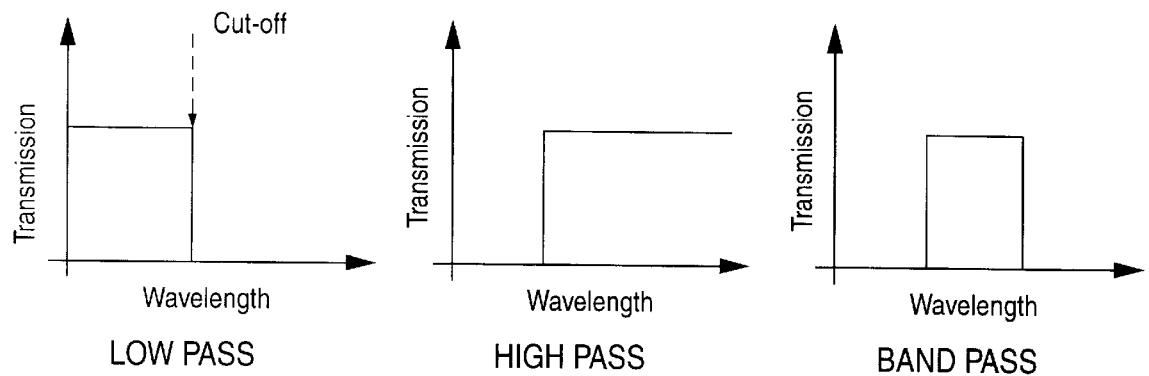

United States Patent [19]
Davey et al.

[11] Patent Number: 6,078,421
[45] Date of Patent: Jun. 20, 2000

[54] LIGHT MODULATOR INCLUDING A COLLIMATOR COMPRISING AN INTERFERENCE FILTER

[75] Inventors: Anthony B. Davey, Bishops Stortford; Paul A. Bayley, Hereford; Timothy M. Coker, Oundle; William A. Crossland, Harlow, all of United Kingdom

[73] Assignee: The Secretary of State for Defence in Her Majesty's Government of the United Kingdom of Great Britain and Northern Ireland, Farnborough, United Kingdom

[21] Appl. No.: 09/402,613

[22] PCT Filed: Apr. 24, 1998

[86] PCT No.: PCT/GB98/01203

§ 371 Date: Oct. 25, 1999

§ 102(e) Date: Oct. 25, 1999

[87] PCT Pub. No.: WO98/49585

PCT Pub. Date: Nov. 5, 1998

[30] Foreign Application Priority Data

Apr. 25, 1997 [GB] United Kingdom ............... 9708468

[51] Int. Cl.[7] .................... G02B 26/00; G02B 5/28
[52] U.S. Cl. .................. 359/237; 359/350; 359/359; 359/360; 359/588; 359/589; 359/722; 362/31; 349/64; 428/216
[58] Field of Search ................... 359/237, 247, 359/350, 359, 360, 361, 586, 588, 589, 707, 722; 362/31; 349/64, 65; 428/214, 216

[56] References Cited

U.S. PATENT DOCUMENTS

| | | | |
|---|---|---|---|
| 5,173,808 | 12/1992 | Auer et al. | 359/722 |
| 5,572,500 | 11/1996 | Ikeya et al. | 369/99 |
| 5,933,273 | 8/1999 | Ferrante et al. | 359/359 |
| 5,956,107 | 9/1999 | Hashimoto et al. | 349/64 |
| 5,965,365 | 10/1999 | Shirai | 359/359 |
| 5,966,240 | 10/1999 | Lange et al. | 359/589 |
| 5,978,134 | 11/1999 | Chaton et al. | 359/360 |
| 5,993,950 | 11/1999 | Novis et al. | 428/216 |
| 5,999,322 | 12/1999 | Cushing | 359/589 |

FOREIGN PATENT DOCUMENTS 0 529 832  3/1993  European Pat. Off.
95/27920  10/1995  WIPO.

OTHER PUBLICATIONS

Patent Abstracts of Japan, vol. 095, No. 005, Jun. 30, 1995, & JP 07 0435238 A (Fuji Photo Film Co. Ltd), 141 Feb. 1995.

Patent Abstracts of Japan, vol. 008, No. 171 (P–293), Aug. 8, 1984 & JP 59 067503 A (Matsushita Denki Sangyo KK), Apr. 17, 1984.

Patent Abstracts of Japan, vol. 017, No. 669 (P–1657), Dec. 9, 1993 & JP 05 224002 A (Fuji Photo Optical Co Ltd.), Sep. 3, 1993.

Soviet Journal of Optical Technology, vol. 46, No. 1, Jan. 1979, pp. 57–58, XP002073633, .N. Cherepanova et al., "Optical Properties of Narrow–Band Interference Filters as Function of Incidence Angle and Polarization of the Incident Light".

IBM Technical Disclosure Bulletin, vol. 29, No. 11, Apr. 1, 1987, pp. 4838–4839, XP002001571, "Backlighting For Liquid Crystal Display".

*Primary Examiner*—Loha Ben
*Attorney, Agent, or Firm*—Nixon & Vanderhye P.C.

[57] ABSTRACT

A collimator is formed of a stack of layers (11) of different thicknesses in a way analogous to a low-pass interference filter. When illuminated by narrow-band light of a predetermined wavelength just within the pass band of the filter, the collimator preferentially transmits light incident within a predetermined angular range, usually near-normal. The collimator is especially useful with photoluminescent liquid-crystal display, having phosphor emitters (17), because the collimator layers can simply be deposited on one face of the liquid-crystal modulator (1).

18 Claims, 6 Drawing Sheets

LIGHT MODULATOR INCLUDING A COLLIMATOR COMPRISING AN INTERFERENCE FILTER

This invention relates to an improved collimator, particularly for use with a liquid-crystal display system of the type using a photoluminescent screen, such as are discussed, for instance, in WO 95/27920 (Crossland et al).

Means for producing collimated light suitable for use with liquid-crystal display cells are known. For example, IBM Technical Disclosure Bulletin (1987) discloses at page 4838 a system involving a light guide plate and a lens plate with a plurality of moulded lenslets placed in front of the plate. The moulded lenslets collimate the light passing through holes in the light guide plate. A similar arrangement is disclosed in European patent application No. 529 832 (Rockwell International). In that case, phosphors are used to provide small spots of light to be focused by a lens array.

Collimators can be desirable in liquid-crystal displays for various reasons, one being that when a diffuse light source is used the light passing through a single cell, not being collimated, will spread and cover a substantial area of the photoluminescent screen, leading to crosstalk. This will impair the resolution of the screen, and is of particular significance for LCDs using a photoluminescent screen, where in colour displays it may result in a phosphor of the wrong colour being illuminated. For the standard kinds of liquid-crystal cells increasing the collimation of the backlighting has the disadvantageous effect of reducing the angle of view of the display, though the display is brighter in the collimation direction. The light from the display thus has to be spread out again using, for instance, a diffuser plate. In photoluminescent LCDs (PLLCDs), however, the phosphor on the front screen performs the diffusing Function to great advantage, as explained in WO 95/27920. However, prior art collimators are bulky and require expensive manufacturing techniques to produce the lens array accurately.

Anti-reflection coatings for optical components are also known. These work on the principle that all the light incident normal to a transparent surface of refractive index $n_1$ is transmitted if the surface is covered with a thin film of refractive index $n_2$ which satisfies the relations:

$$n_0 \times n_1 = n_2^2 \text{ and } n_2 \times d = \lambda/4$$

where $n_0$ is the refractive index of air; d is the cell thickness; and $\lambda$ is the wavelength of the light used. At other angles of incidence (and at other wavelengths) some of the light is reflected.

The anti-reflection coating only works optimally for light at normal incidence at a specific wavelength. However, by using a plurality of dielectric layers of varying refractive index and thickness the spectral pass band at normal incidence can be improved. The invention is based on the recognition that thin dielectric coatings can be put to novel use in displays.

Collimator-like devices based on dielectric coatings are also known. For example, JP 07-43528 (Fuji Photo Film Co. Ltd.) discloses a filter device designed to protect a photosensitive material from light entering at angles other than a specified angle and wavelength and JP 59-67503 (Matsushita Electric Industrial Co. Ltd.) describes a spectroscopic dispersion element which uses wedge-shaped interference filters to pass only light perpendicular to the plane of the filter, further spectrally narrowing the passed light as a consequence of the spectral dispersion of the elements of the filter. U.S. Pat. No. 5,572,500 (Pioneer) uses an interference filter to eliminate diffractive lobes to make a smaller beam spot in a laser recording system.

According to a first aspect of the invention there is provided a collimator for light in a narrow band around a predetermined wavelength, comprising an interference filter having a stack of dielectric layers with optical thicknesses adapted to transmit light in the band incident at a predetermined range of angles of incidence centred at normal incidence more efficiently than light in the band incident at other angles, in which the interference filter has the form of a low-pass filter with a cut-off wavelength longer than the predetermined wavelength.

In an alternative aspect the collimator comprises an interference filter having a stack of dielectric layers with optical thicknesses adapted to transmit light in the band incident at a predetermined range of angles of incidence excluding a range centred at normal incidence more efficiently than light in the band incident at angles around normal incidence, in which the interference filter has the form of a high-pass filter with a cut-off wavelength longer than the predetermined wavelength.

The invention is also directed to light sources and modulating devices such as displays using a collimator for light in a band around a predetermined wavelength, comprising an interference filter having a stack of dielectric layers with optical thicknesses adapted to transmit light in the band incident over a predetermined range of angles of incidence more efficiently than light in the band incident at other angles.

The collimator can be used in combination with a diffuse source to provide a light input for an optical modulating device, in particular an LCD. An interference filter is particularly advantageous since the thin film takes virtually no space and can be incorporated as a layer on an existing component such as a glass plate for the LCD.

The filter is of course suited for use with a narrow range of wavelengths of the input light. Hence the light source should be near-monochromatic, or narrow-band, for best results. This would not normally be desirable for LCDs, at least for colour displays, but for PLLCDs it is usually the case that the input is narrow-band near-visible UV light, which is ideally suited for use with a sharp cut-off filter. The colour output is then provided by the phosphors.

In either the angular or wavelength domain a general filter can be considered as one of 3 types: a low-pass filter, a high-pass filter, or a bandpass filter. When considered in the wavelength domain the low-pass filter is also termed a short-wave pass filter, similarly the high-pass filter is termed a long-wave pass filter. The short-wave and long-wave filters can also be referred to as edge filters, having a single edge in their response; the position of this edge is itself referred to as the cut-off of the filter. For clarity the cut-off of such a filter is generally defined as the point at which the response (usually the transmission) is 50% at normal incidence. A similar definition can be used for the cut-off of a filter in the angular domain. Ideal transmission-wavelength graphs for these filter types are shown in FIG. 1.

Bandpass filters have two edges and therefore two cut-offs; in the wavelength domain these are referred to as the long- and short-wavelength cut-offs.

Figure 2:
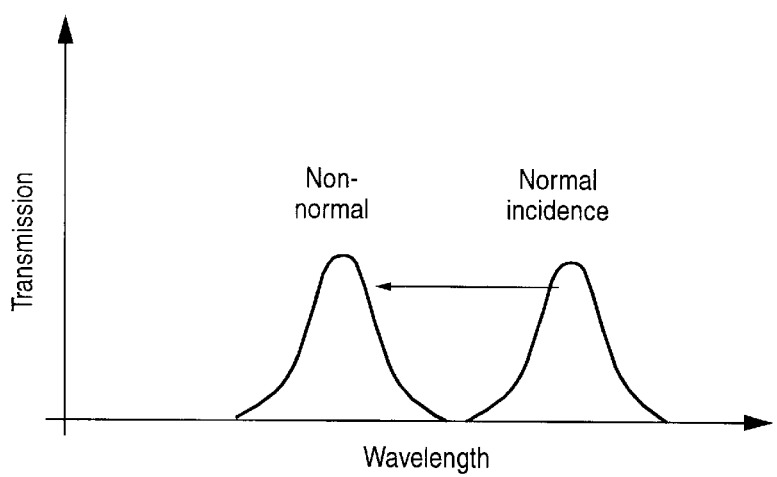

It is known that the form of the response of an interference filter, in the wavelength domain, moves to shorter wavelengths as the angle of incidence increases; this is shown diagrammatically in FIG. 2.

If the performance of a filter in the wavelength domain at normal incidence has a bandpass-type appearance then the performance in the angular domain at a particular wavelength can be predicted to a greater or lesser extent using this quality. For example, and referring to FIG. 3, the performance in the angular domain at wavelength $\lambda_0$ will be that shown in FIG. 4 (referred to as a low-pass filter) whilst the performance at $\lambda_1$ will be that shown in FIG. 5 (a bandpass filter).

Figure 6:
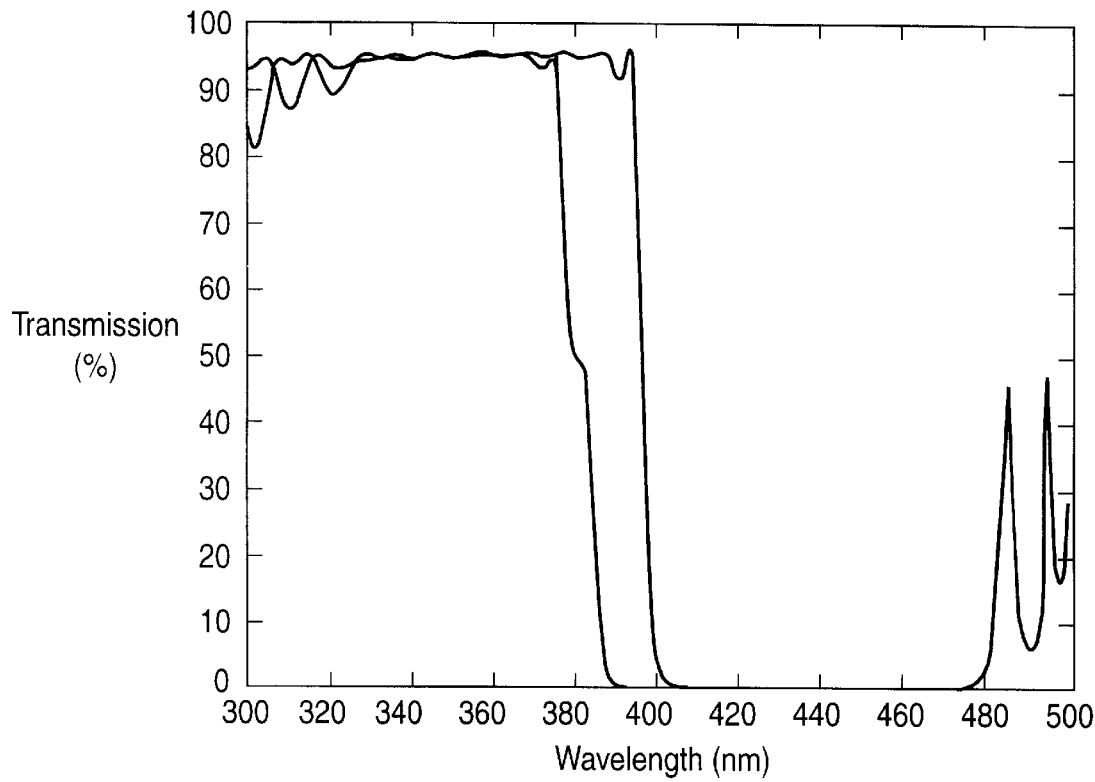

These figures are only schematic, of course, because strictly speaking the form of the response is not preserved exactly as the angle of incidence increases. FIG. 6 shows the actual response for a short-wave pass edge filter prepared for use in the invention at two angles of incidence, normal and 30°.

Nevertheless it can be seen that for wavelengths close to the cut-off the pass characteristics are sensitive to the angle of incidence. A wavelength of, say, 390 nm will be largely passed at normal incidence but nearly totally reflected at 30°.

Figure 4:
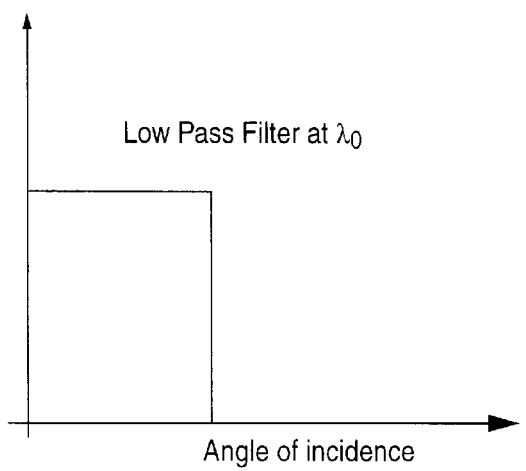

In PLLCD applications, the required performance in the angular domain is normally that of the low-pass filter. In this case the required response in the wavelength domain need not be precisely "bandpass" and a short-wave edge filter, such as shown in FIG. 4, may well be adequate.

Figure 7:
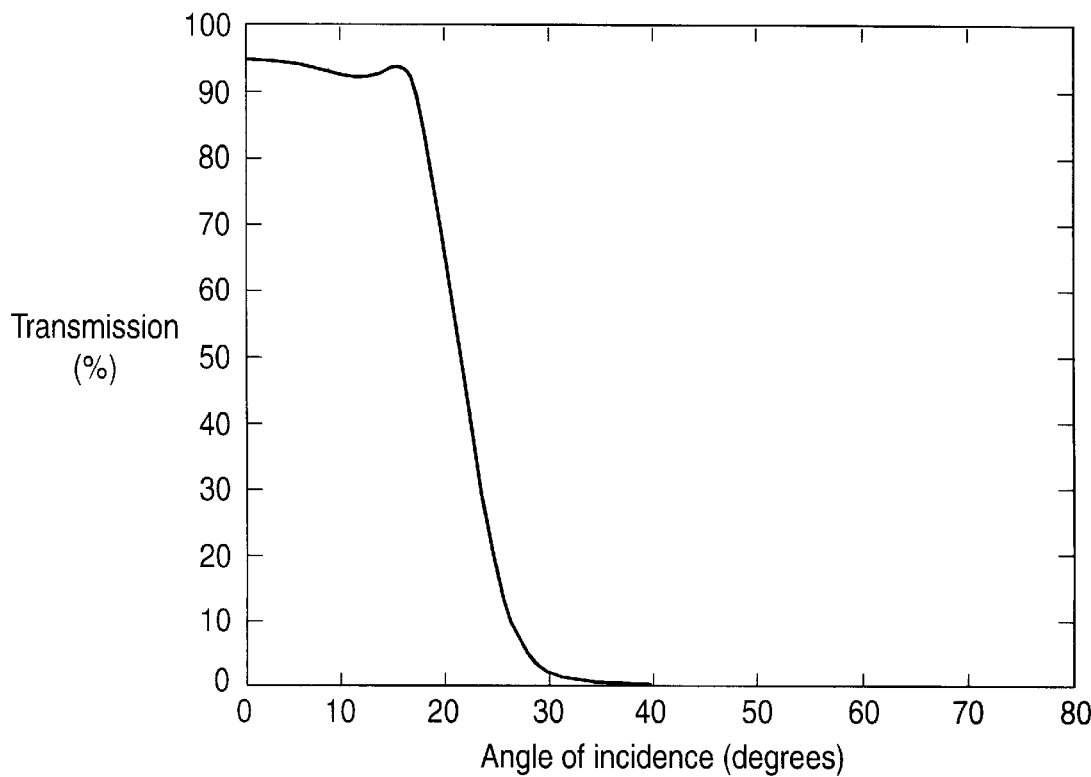

If near-normal light is to be passed then the cut-off of the edge filter should be placed on the long-wavelength side of the design wavelength (i.e. of the peak of the spectrum of the source). For example the cut-off for the filter of FIG. 6 is at 396 nm which is on the long-wavelength side of a design wavelength such as 388 nm. The resulting response, in the angular domain at 388 nm, is shown in FIG. 7. This response shows that the angular distribution of a 388 nm diffuse source would be restricted to ±25° or so upon passing through the filter.

A tighter distribution would be achieved by placing the cut-off closer to the design wavelength, and clearly a trade-off takes place: increasing the cut-off wavelength maximises the transmission of light, but the light will have a wider angular divergence. On the other hand if the cut-off wavelength is lowered, so that the wavelength of the monochromatic light lies near or even on the steep edge at the limit of the pass band of the graph of transmission coefficient against wavelength, then improved collimation results at the cost of lower brightness.

For practical filters such as are shown in FIG. 6 the steep edge terminates at the top in a smaller or larger peak or "first maximum" whose size depends on the quality of the filter. This peak is useful for defining the wavelength of the source in relation to the filter characteristics. In general the predetermined wavelength should be close to the cutoff, on its short wavelength side, to allow sufficient throughput of light. The layers could be adapted to ensure that the transmission at the predetermined wavelength is at least 80 or 90% of the transmission at the first maximum. As an alternative criterion, if the light source has a finite bandwidth $\Delta$ (as in practice it will) then the cutoff of the filter should be designed to ensure that substantially all (at least 90%) of the light output is passed (not reflected) by the filter.

In a variant embodiment, if only off-normal light should be transmitted, a high-pass filter can be used, with the source wavelength (i.e. the predetermined wavelength) lying on the short-wavelength side of the cut-off.

The substrate is preferably a flat plate and the collimator is used in combination with an optical device which makes use of the collimated light output.

The efficiency of a simple stack can be quite low, for example an ideal low-pass angular filter with the cut-off at 30°, would have an efficiency of 50% when used with a Lambertian source. In order to improve the efficiency or overall throughput a means of regenerating the rejected light is provided; this is possible because light that is not passed by the filter is not absorbed but, in the case where the filter is being used in transmission, reflected. The rejected or reflected light is then re-presented to the filter by a suitable means, exemplified by a highly reflecting but diffusing mirror (see FIG. 8).

Since there are many parameters that can be varied to adjust the transmission spectrum the easiest procedure to design a collimator according to the invention is to use a computer program which can calculate the transmission coefficient as a function of wavelength and angle for a plurality of layers of given dielectric constants. Such a computer program is not difficult to write.

The two dielectric materials are preferably chosen to have refractive indices, at the predetermined wavelength, as widely spaced as possible. For example, tantalum pentoxide ($Ta_2O_5$) and silicon dioxide ($SiO_2$) may be chosen, which have refractive indices of about 2.3 and 1.47 respectively at a wavelength of 388 nm. Titanium dioxide ($TiO_2$) would be an alternative (if somewhat lossy) higher-refractive-index material, and magnesium difluoride an alternative lower refractive index material.

Once the materials are selected their thicknesses must be chosen. A suitable program can then be used to evaluate the performance of the resulting filter. Good results have been obtained by selecting the high refractive index layers to have identical thicknesses of a quarter of the predetermined wavelength, for instance.

Terminology such as $(HL)^n$ will be used in which H refers to a layer of high-index material and L refers to a layer of low-index material. The thickness of each layer is considered to be one quarter wavelength in the appropriate medium. A regular stack can be created by repeating the layers within the brackets 'n', times; hence a $(HL)^{10}$ design will have 20 layers, 10 of each material. Furthermore, arbitrary designs can be described with this terminology, such as $(HL)^3(2H)(LH)^3$ for example. See James D Rancourt, 'Optical Thin Films—Users' Handbook' for further explanation and examples.

Figure 9:
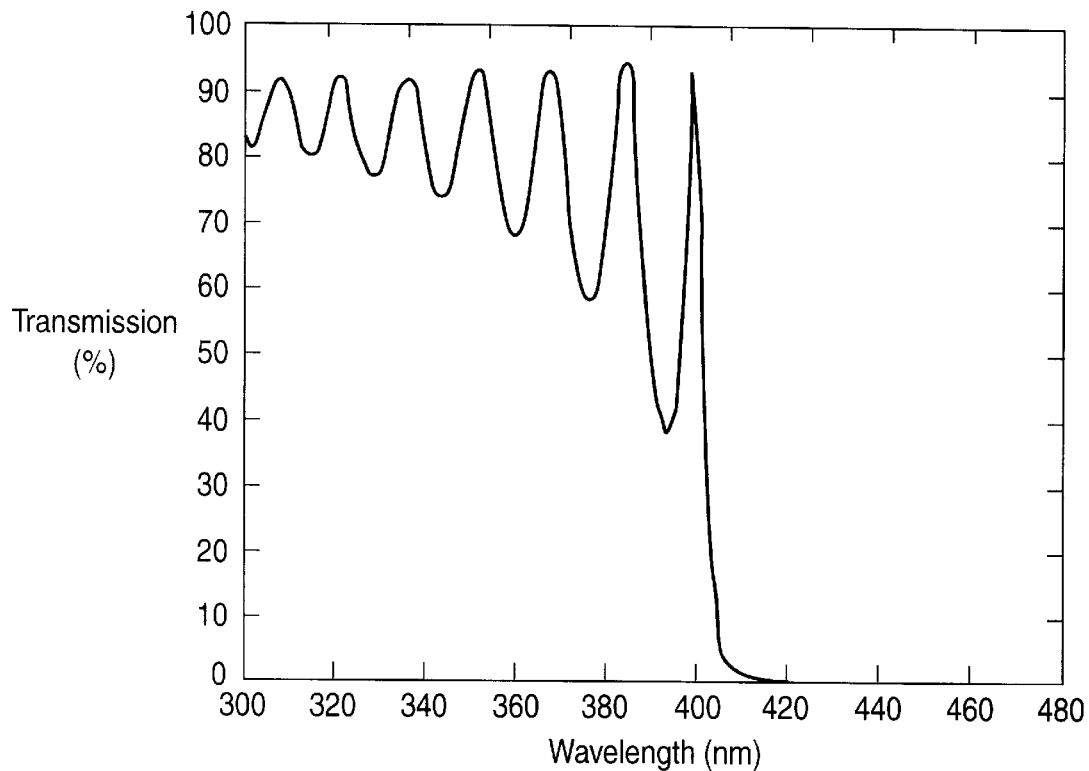
Figure 10:
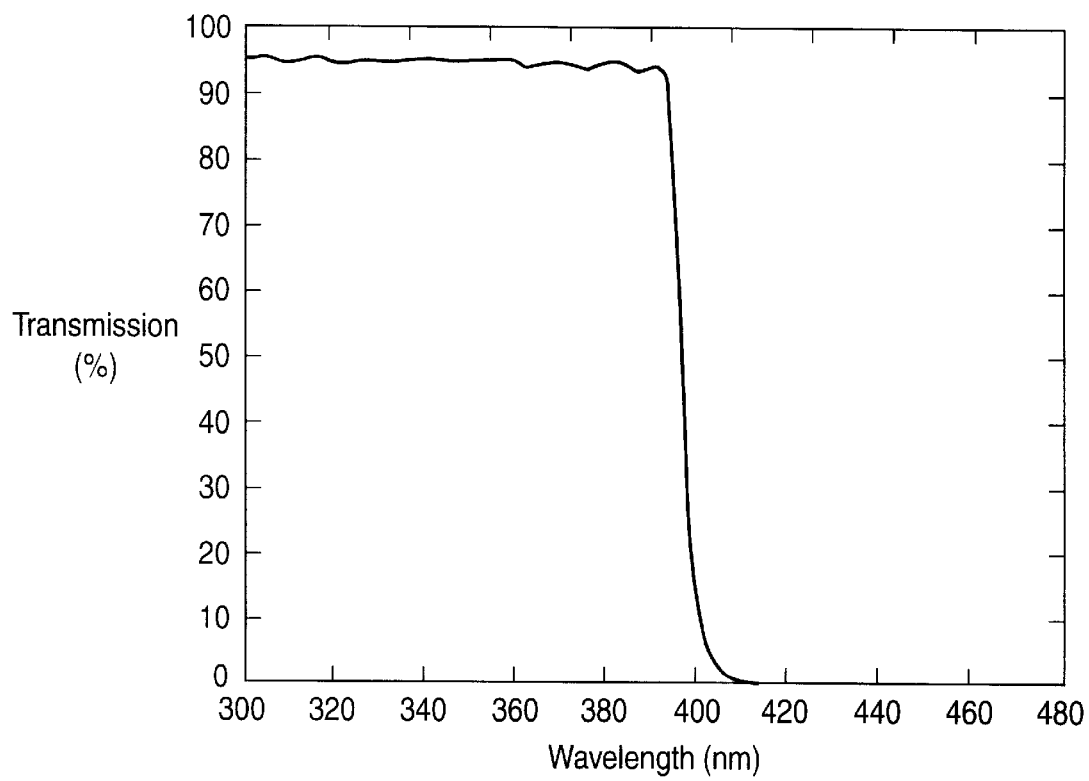

The preferred embodiment of a short-wave-pass filter such as can be used to restrict the angular distribution of light as described above is designed by designing an $(HL)^n$ filter positioned correctly in the wavelength domain and then using an optimisation algorithm, e.g. as provided in TFCalc, to improve the performance against appropriate optimization targets. This process is shown in FIG. 9 and FIG. 10. If the pass band in the wavelength domain has been positioned correctly by the above process then the required performance in the angular domain will be achieved. FIG. 9 shows the un-optimized edge filter constructed from a $(HL)^{13}$ stack, whilst FIG. 10 shows the edge filter after optimization.

The collimator according to the invention has the apparent disadvantage that it is only suitable for light in a wavelength band around the predetermined wavelength. However, for applications using substantially monochromatic light this is not a disadvantage and the greater simplicity, ease of manufacture and reduced thickness of the collimator according to the invention as compared to multiple lens arrays is highly advantageous. The collimator is therefore preferably used in combination with a source of matched substantially monochromatic light.

Preferably, the layers are inorganic layers, which can be deposited using known techniques. Preferably, no more than two different dielectric materials are used provided alternately on the substrate surface. In order to achieve sufficient angular discrimination, it is generally necessary to provide at least three pairs of dielectric layers. In some current embodiments, around twenty-five pairs are used, which provide good angular discrimination without creating excessive manufacturing difficulties.

For PLLCDs the predetermined wavelength is preferably about 388 nm, but 365 nm (a common wavelength for mercury discharge lamps) can also be used. The dielectrics should have refractive indices as widely separated as possible. A predetermined wavelength of 405 nm is possible in alternative embodiments. It is also conceivable to select the wavelength for a given stack, rather than to adapt the stack for a given wavelength. However, since most light sources emit at a fixed wavelength it is generally easier to adjust the thicknesses of the layers.

The invention can be used to collimate light for a liquid-crystal display, or at least to improve the collimation of light in such a display. Such a liquid-crystal display can include a liquid-crystal cell for modulating monochromatic light sandwiched between a front and a rear transparent substrate, in which a stack of layers with different dielectric constants is provided on the rear transparent substrate adapted to transmit light in a predetermined narrow-wavelength band incident substantially normally to the substrate and to reflect such light incident at other angles, e.g. above about 25°.

Preferably, the liquid-crystal display is a photoluminescent liquid-crystal display (PL-LCD) in which a photoluminescent layer is provided at the front transparent substrate. The liquid-crystal display may be of the type having two polarizers sandwiching the liquid-crystal cell, one provided on the outside of each of the transparent substrates. The polarizers could be either linear or circular, and for some types of liquid-crystal cell one of each is used. The stack is preferably placed on (i.e. on the light-source side of) the first polarizer.

Preferably, the liquid-crystal display further comprises a light source arranged behind the rear transparent substrate to produce the narrow-band input radiation.

Most of the light emitted by the light source is not transmitted by the plurality of layers and is specularly reflected from them. Therefore, in order not to waste this reflected light, a diffuse reflector is preferably provided behind the light source, as mentioned above. Some of the light reflected by the diffuse reflector will be within the desired angular pass band and will be transmitted by the plurality of layers; the rest of the light will be reflected once again back to the diffuse reflector for further reflection back towards the LCD.

In edge-lit embodiments, the light source may be provided at the side of the transparent substrate and a scattering surface provided on the opposite side of the transparent substrate to the stack of layers.

Figure 3:
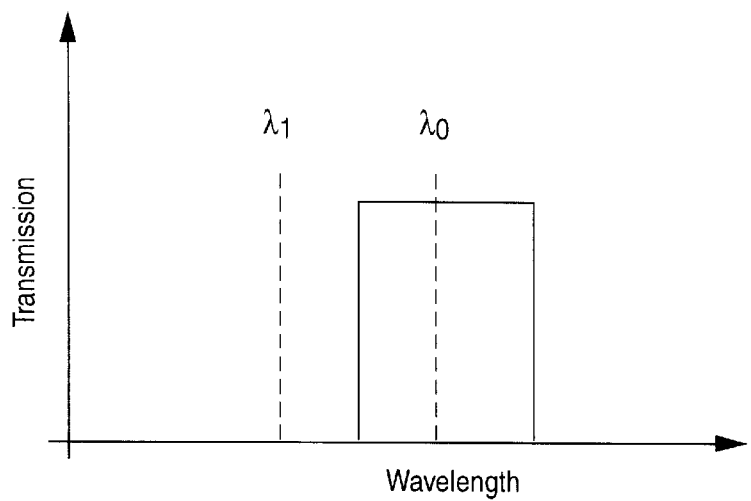
Figure 5:
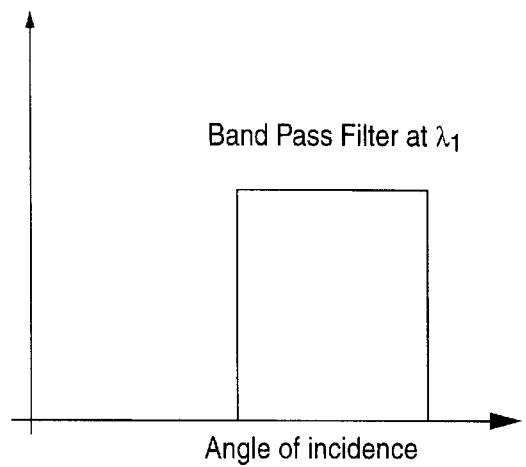
Figure 8:
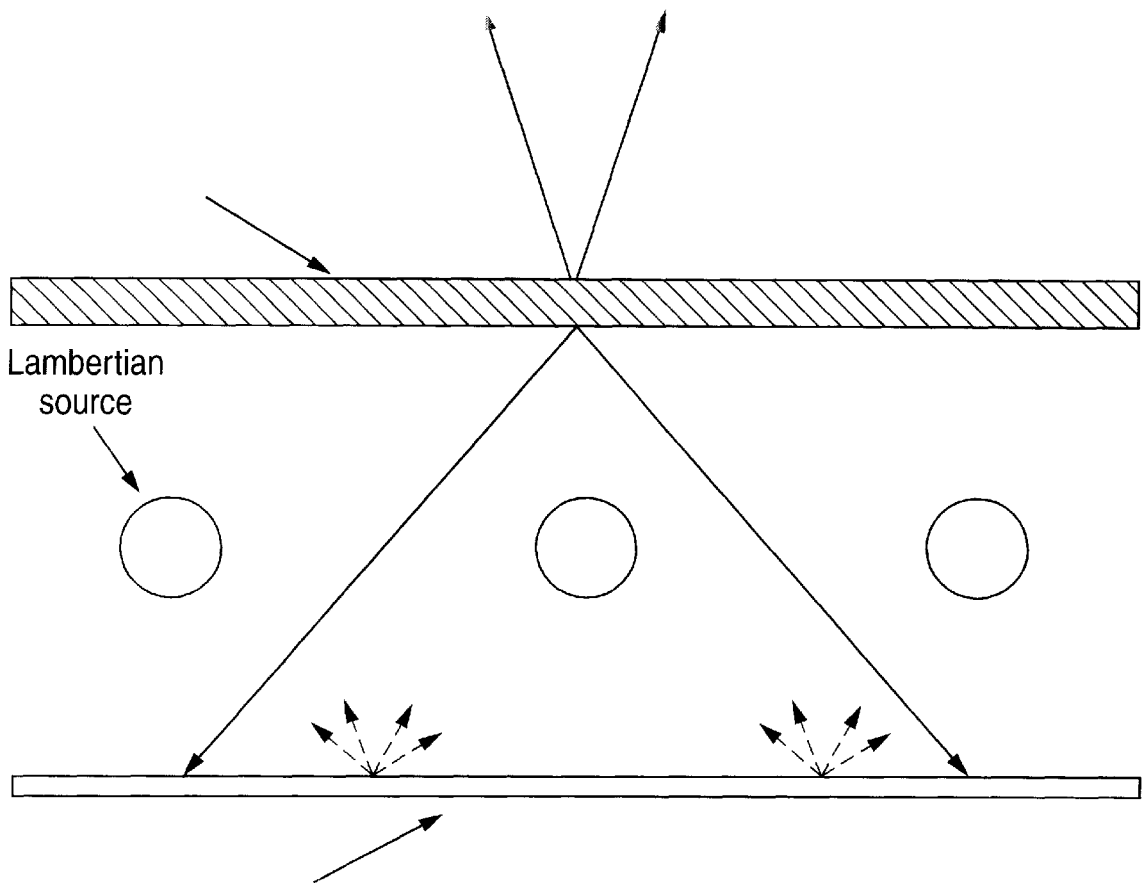
Figure 11:
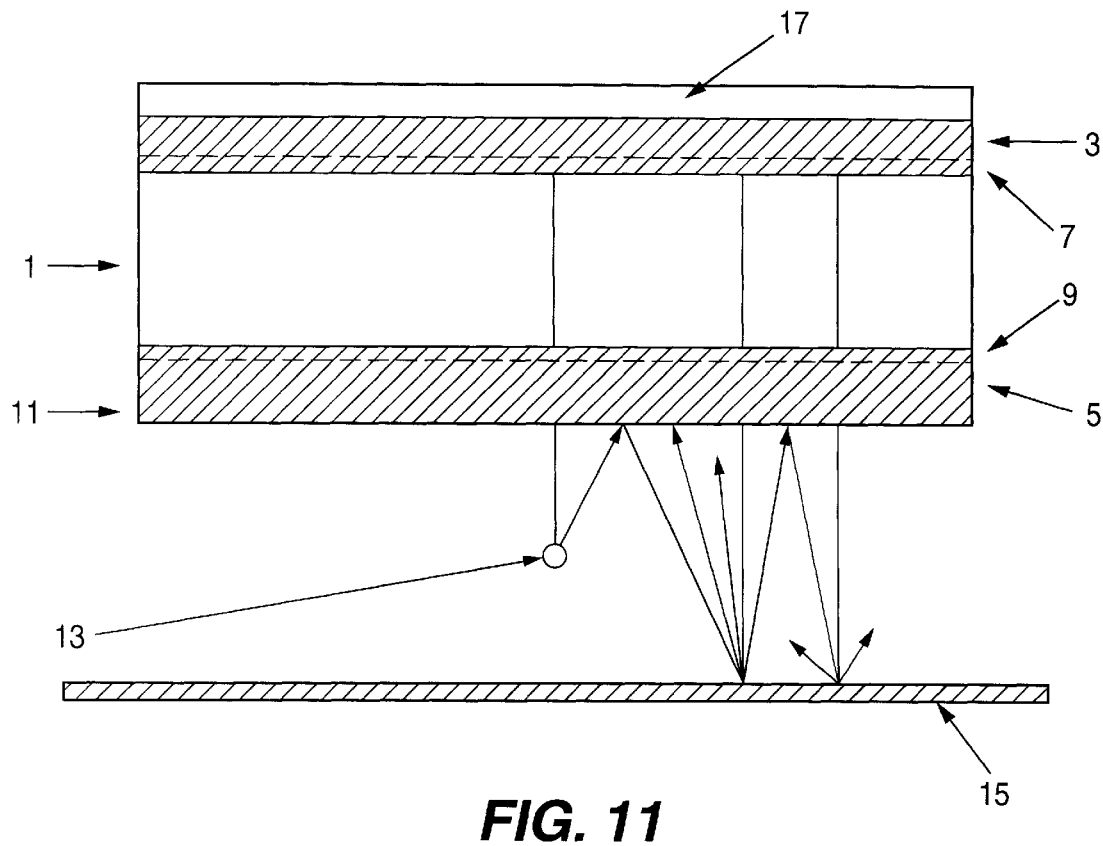
Figure 12:
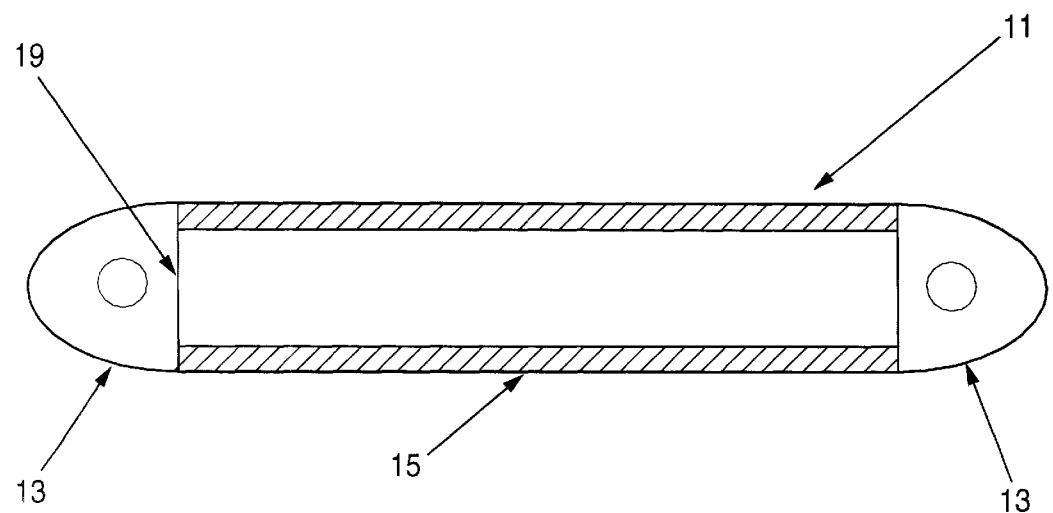

For a better understanding of the invention a specific embodiment will now be described, purely by way of example, with reference to the accompanying figures, in which:

FIG. 1 shows schematic transmission coefficients of ideal edge and band-pass filters, FIG. 2 shows the shifted response of a band-pass filter with a varying angle of incidence, FIG. 3 shows an ideal band-pass filter in the wavelength domain, FIG. 4 shows the incidence angle dependence of the filter shown in FIG. 3 at a wavelength $\lambda_0$, FIG. 5 shows the incidence angle dependence of the filter shown in FIG. 3 at a wavelength $\lambda_1$, FIG. 6 shows an actual filter response at two angles of incidence 0° and 30°, for light of wavelength 388 nm, FIG. 7 shows the incidence angle dependence of the filter of FIG. 6, FIG. 8 shows a schematic arrangement according to the invention, FIG. 9 shows the transmission of an unoptimized edge filter constructed from a $(HL)^{13}$ stack, FIG. 10 shows the edge filter after optimization, FIG. 11 shows a schematic of a liquid-crystal display device according to the invention, and FIG. 12 shows an alternative backlight arrangement.

In FIG. 11, a liquid crystal layer 1 is shown contained between a front transparent substrate 3 and a rear transparent substrate 5. Two polarizers 7, 9 are provided between the liquid crystal cell and the transparent substrates. Electrodes are provided on the transparent substrates 3, 5 to control the liquid crystal cell 1. In this embodiment, the transparent substrates 3, 5 are made of glass. A dielectric stack 11 is provided on the rear face of the rear transparent substrate 5. A diffuse reflector 15 is provided behind the rear of the display, and a light source 13 is provided between the diffuse reflector 15 and the dielectric stack 11. The light source can be, for instance, a set of phosphor-coated mercury vapour discharge tubes, emitting UV light at about 365 or 388 nm. RGB Phosphors 17 are provided on the front transparent substrate 3 to provide the visible image when struck by UV light passed by the liquid crystal.

The dielectric stack 11 comprises a stack of pairs of dielectrics. The chosen dielectrics in many embodiments are $Ta_2O_5$ and $SiO_2$ whose refractive indices are n=2.3 and n=1.47 respectively at a wavelength $\lambda$ of 388 nm. In a first embodiment the thickness of the layers with the lower dielectric constant is given by $\lambda/4$, here 97 nm, and the layers with the higher dielectric constant have a thickness of $\lambda/2.955$, here 131 nm (or 91 and 124 nm respectively for light at 365 nm). In a more sophisticated embodiment the thickness of each layer is chosen independently, and twenty-five pairs of layers make up the dielectric stack 11, i.e. fifty layers are provided, twenty-five each of $Ta_2O_5$, and $SiO_2$ in an alternating arrangement. The thicknesses are as given in the table at the end of the description. In an alternative embodiment pairs of layers of titanium dioxide and magnesium difluoride are used.

FIG. 6 shows the transmission coefficient T of the dielectric stack used in the embodiment of FIG. 11 as a function of wavelength. As can be seen, maximum reflection of the dielectric stack occurs for wavelengths between 400 nm and 480 nm and maximum transmission occurs below about 385 nm. A suitable light source is a low-pressure mercury discharge lamp with a phosphor which emits light around a wavelength of 365 nm in a wavelength band of width approximately 20 nm; more recently phosphors emitting at around 388 nm have been used, with an advantageously narrow FWHM bandwidth of 13–14 nm—see for instance L Ozawa and H N Hersch, Journal of the Electrochemical Society, Vol 122 No 9, p. 1222 (1975).

The transmission coefficient of the stack as a function of incident angle at 388 nm is shown in FIG. 7. As can be seen, transmission for light 20° away from normal is much less than for normally incident light, and very little light incident at 30° from the normal is transmitted. Whether such collimation is sufficient depends on the pixel size and exact structure of the display, and on the opto-electronic properties of the liquid crystal. In any event, the collimation is an improvement. Such collimation is particularly important for colour PL-LCD displays in which it is important that light hits the phosphor having the correct colour, and not a neighbouring phosphor, which generally has a different colour.

In use, the light source 13 emits light (shown in FIG. 11 using arrows). The source is shown schematically as a point but in practice would be one or more tubes. Part of the light is emitted in the correct direction, is normally incident on the dielectric stack and passes through it. The remainder of the light is reflected back to the diffuse reflector 15. This reflector returns the light to the dielectric stack at various angles; once again some will pass through the dielectric stack and most will be reflected, repeating the process.

The dielectric stack transmits only a small proportion of the incident light. Therefore, it is very important that the diffuse reflector has a good reflectivity in order to avoid wasting too much of the emitted light.

The light incident upon the dielectric stack at a substantially normal angle of incidence is transmitted through to the liquid crystal cell 1. The liquid crystal 1, in conjunction with the polarizers 3, 5, modulates the light. The phosphors 17 of the photoluminescent screen emit visible light to form the image where they are excited by light transmitted through the polarizers 3, 5 and the liquid crystal cell. In the region where no light is transmitted through the polarizers 3, 5 and cell 1, the phosphors 17 remain dark.

The dielectric stack in this embodiment has another advantage when combined with a liquid crystal display using phosphors and ultraviolet light (i.e. light of a wavelength less than about 400 nm): it filters out the visible lines of a mercury lamp, at least for normal incidence, at wavelengths between 400 and 480 nm, as can be seen from FIG. 6. The peaks of transmission above 480 nm belong to the 30° curve.

The collimator of the present invention can be combined with other collimating components if desired. Furthermore, it is possible to mount the dielectric stack on other components of a liquid-crystal display system and not directly onto the transparent substrate surrounding the liquid-crystal cell. Indeed, the collimator is useful wherever rough collimation of highly monochromatic light is required and not necessarily only for displays.

FIG. 12 shows an alternative backlight arrangement. Light sources 13, e.g. phosphor-coated low pressure mercury discharge tubes with suitable reflectors as shown, are provided around the edges of a flat transparent substrate 19; a diffuse reflector 15 is provided on the rear of the transparent substrate and the dielectric stack 11 on the front surface. The arrangement operates in the same way as the arrangement of FIG. 11, except that the light source is no longer between the diffuse reflector and the stack.

TABLE

|  |  | /nm |  | /nm |
|---|---|---|---|---|
| 1st pair | $Ta_2O_5$ | 64.55 | $SiO_2$ | 85.06 |
| 2nd pair | $Ta_2O_5$ | 53.18 | $SiO_2$ | 78.83 |
| 3rd pair | $Ta_2O_5$ | 50.06 | $SiO_2$ | 79.53 |
| 4th pair | $Ta_2O_5$ | 52.17 | $SiO_2$ | 76.02 |
| 5th pair | $Ta_2O_5$ | 50.66 | $SiO_2$ | 76.08 |
| 6th pair | $Ta_2O_5$ | 49.86 | $SiO_2$ | 78.21 |
| 7th pair | $Ta_2O_5$ | 51.33 | $SiO_2$ | 74.10 |
| 8th pair | $Ta_2O_5$ | 49.98 | $SiO_2$ | 75.34 |
| 9th pair | $Ta_2O_5$ | 51.15 | $SiO_2$ | 77.02 |
| 10th pair | $Ta_2O_5$ | 50.03 | $SiO_2$ | 77.47 |
| 11th pair | $Ta_2O_5$ | 49.16 | $SiO_2$ | 76.33 |
| 12th pair | $Ta_2O_5$ | 48.56 | $SiO_2$ | 77.33 |
| 13th pair | $Ta_2O_5$ | 50.66 | $SiO_2$ | 77.64 |
| 14th pair | $Ta_2O_5$ | 48.62 | $SiO_2$ | 76.33 |
| 15th pair | $Ta_2O_5$ | 50.08 | $SiO_2$ | 78.62 |
| 16th pair | $Ta_2O_5$ | 49.88 | $SiO_2$ | 76.80 |
| 17th pair | $Ta_2O_5$ | 49.70 | $SiO_2$ | 75.73 |
| 18th pair | $Ta_2O_5$ | 51.11 | $SiO_2$ | 76.91 |
| 19th pair | $Ta_2O_5$ | 51.40 | $SiO_2$ | 78.40 |
| 20th pair | $Ta_2O_5$ | 47.41 | $SiO_2$ | 81.94 |
| 21th pair | $Ta_2O_5$ | 54.55 | $SiO_2$ | 77.57 |
| 22th pair | $Ta_2O_5$ | 56.02 | $SiO_2$ | 91.77 |
| 23th pair | $Ta_2O_5$ | 60.17 | $SiO_2$ | 95.25 |
| 24th pair | $Ta_2O_5$ | 59.75 | $SiO_2$ | 82.80 |
| 25th pair | $Ta_2O_5$ | 58.70 | $SiO_2$ | 38.31 |

What is claimed is:

1. A collimator for light in a narrow band around a predetermined wavelength, comprising an interference filter (11) having a stack of dielectric layers with optical thicknesses adapted to transmit light in the band incident at a predetermined range of angles of incidence centered at normal incidence more efficiently than light in the band incident at other angles, in which the interference filter has the form of a low-pass filter with a cut-off wavelength longer than the predetermined wavelength.

2. A collimator according to claim 1, in which the pass band of the filter is optimized so as to be substantially flat.

3. A collimator according to claim 1, in which the response of the filter has a first peak of transmission at the short-wavelength side of the cut-off at a wavelength which is less than or equal to the predetermined wavelength.

4. A collimator according to claim 1, wherein the predetermined wavelength falls in the visible region.

5. A collimator according to claim 1, wherein the predetermined wavelength falls in the ultra-violet.

6. A directional light source including a collimator according to claim 1 and a diffuse lighting arrangement adapted to produce light in a narrow band around the predetermined wavelength.

7. A light source according to claim 6, further having a means to return light rejected by the collimator to the collimator to improve the light throughput.

8. A light source according to claim 7, in which the light return means includes a highly reflecting diffuse surface.

9. A light modulator comprising an optical modulating device for light in a narrow band around a predetermined wavelength and a collimator according to claim 1.

10. A liquid-crystal display, including a collimator (11) according to claim 1 and a liquid-crystal modulator (1) for modulating light.

11. A liquid-crystal display according to claim 10, further including a photoluminescent layer (17) for receiving the modulated light and producing a display.

12. A liquid-crystal display according to claim 11, wherein the interference filter (11) is formed directly on one face (5) of the liquid-crystal modulator and the photoluminescent layer is formed on the opposite face (3).

13. A collimator for light in a narrow band around a predetermined wavelength, comprising an interference filter (11) having a stack of dielectric layers with optical thicknesses adapted to transmit light in the band incident at a predetermined range of angles of incidence excluding a range centered at normal incidence more efficiently than light in the band incident at angles around normal incidence, in which the interference filter has the form of a high-pass filter with a cut-off wavelength longer than the predetermined wavelength.

14. A directional light source including:
a collimator for light in a narrow band around a predetermined wavelength, comprising an interference filter (11) having a stack of dielectric layers with optical thicknesses adapted to transmit light in the band incident at a predetermined range of angles of incidence centered at normal incidence more efficiently than light in the band incident at other angles; and
a diffuse lighting arrangement adapted to produce light in a narrow band around the predetermined wavelength, for passage through the collimator.

15. A light modulator comprising an optical modulating device for light in a narrow band around a predetermined wavelength and a collimator for light in a narrow band around a predetermined wavelength, the collimator comprising an interference filter (11) having a stack of dielectric layers with optical thicknesses adapted to transmit light in the band incident at a predetermined range of angles of incidence centered at normal incidence more efficiently than light in the band incident at other angles; in which the pre-determined range of angles is such as to improve the performance of the light modulator.

16. A light modulator according to claim 15 in which the modulating device is a liquid-crystal device.

17. A display device including a light modulator according to claim 15.

18. A method for collimating light from a diffuse extended light source which emits in a narrow band around a predetermined wavelength, in which the said light is incident upon and is transmitted through a collimator comprising an interference filter (11) having a stack of dielectric layers with optical thicknesses adapted to transmit light in the said narrow band incident at a predetermined range of angles of incidence centered at normal incidence more efficiently than light in the band incident at other angles.

* * * * *